Oct. 23, 1934.   R. R. HAYS   1,977,724
TORQUE COMPENSATOR FOR ROTATING WING SYSTEMS
Filed Jan. 23, 1933

INVENTOR,
Russell R. Hays.
BY Hovey & Hamilton,
ATTORNEYS.

Patented Oct. 23, 1934

1,977,724

UNITED STATES PATENT OFFICE 1,977,724

TORQUE COMPENSATOR FOR ROTATING WING SYSTEMS

Russell R. Hays, Wellsville, Kans.

Application January 23, 1933, Serial No. 653,101

10 Claims. (Cl. 244—19)

This invention relates to aircraft of the helicopter type and having rotating wing systems, and the primary object is to provide torque compensating means for such craft that is sufficient to equal and overcome the torque effect of the rotating wing system.

Another object of the invention is to provide a helicopter having a single propeller mounted in a substantially horizontal position above the fuselage and a torque compensating airfoil which intersects the centrifugal plane of rotation of the propeller, which airfoil is placed at an angle to the normally vertical, longitudinal, central plane of the fuselage for the purpose of establishing a positive attack angle to the helicopter's line of normal flight.

Another object of the invention is the provision of novel landing gear for aircraft of the general type contemplated, which landing gear tends to overcome lateral force, thus permitting the machine to propel itself stably along the ground and also to allow tilting to give the propeller a high horizontal component which results in desired rapid acceleration in obtaining flying speed.

The initial speed attained through the use of specially disposed parts of landing gear and propeller serves both the purpose of making the propeller more effective and efficient with translation and a bringing into effect of the compensator and stabilizers, forming a part of the aircraft, before the helicopter leaves the ground. As a result of such construction, a practical load-carrying machine of the single propeller helicopter type can be designed.

In the invention contemplated, the wing system has articulated wings which makes the helicopter responsive to the controls of the tail assembly which includes the torque compensator. Gyroscopic action usually found in single system rigid propeller types of aircraft is eliminated.

One form of the invention is diagrammatically illustrated in the accompanying drawing, wherein.

Figure 1:
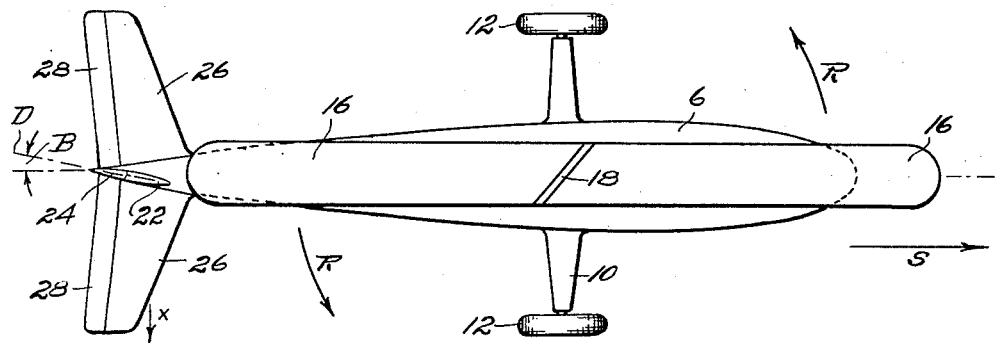
Figure 1 is a top plan view of a helicopter embodying this invention.
Figure 2:
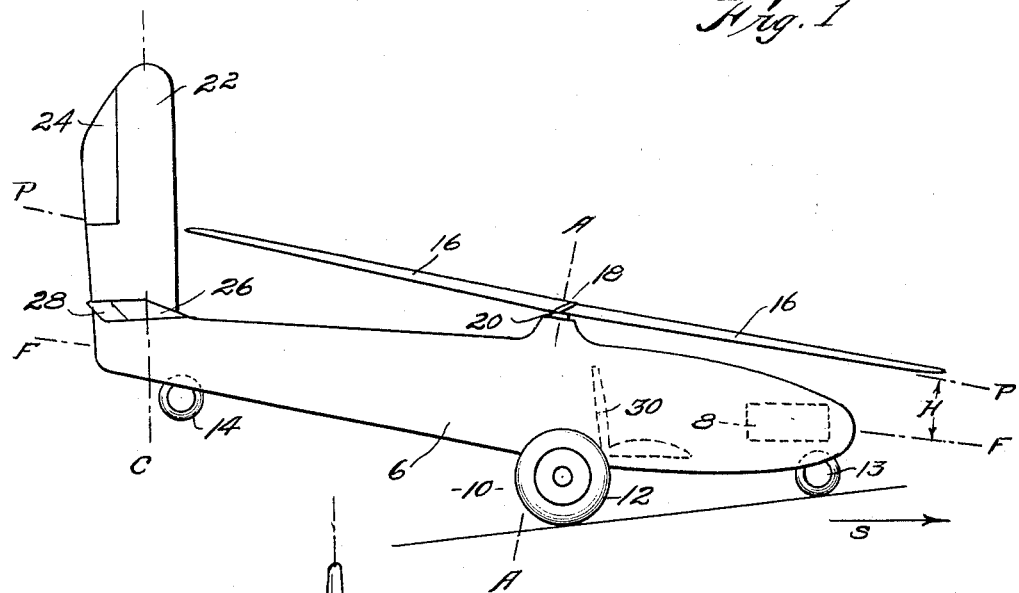
Fig. 2 is a side elevation of the same.
Figure 3:
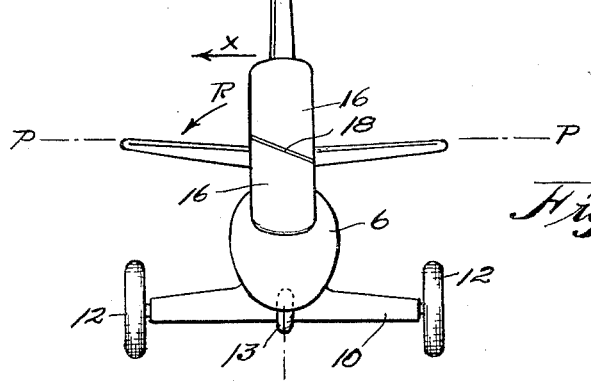
Fig. 3 is a front elevation.

The numeral 6 designates a fuselage of conventional design and having therein means for imparting power to the hereinafter described wing system, such as an engine 8. Fuselage 6 is provided with novel landing gear which combines with the other parts of the helicopter to produce desired results. The two-wheeled portion 10 of this landing gear is positioned beneath fuselage 6 and at a point slightly behind the center of gravity of the entire craft, with the result that fuselage 6 tips forwardly, as shown in Fig. 2. Wheels 12 of the two-wheeled portion 10 always rest upon the ground and when fuselage 6 is tipped forward, a smaller wheel 13, mounted in the nose of fuselage 6, meets the ground, as shown. Another wheel 14 is positioned near the tail end of fuselage 6 to serve as a ground contacting member when the craft is tipped to move the rear portion of fuselage 6 toward the ground.

The wing system employed in constructing a helicopter such as contemplated by this invention is a single propeller having blades 16 articulated at point 18 where the entire propeller is rotatably mounted upon a drive shaft or other suitable element 20, disposed upon an axis designated by line A—A, geared or otherwise connected to engine 8. The point of mounting the wing system should be slightly behind the center of gravity of the craft and the centrifugal plane of rotation designated by line P—P of Fig. 2 should preferably form an acute angle H with the longitudinal axis of fuselage 6 designated by line F—F.

The tail structure of this aircraft of the helicopter type includes the salient feature of this invention in the form of an airfoil compensator or torque compensating panel 22 vertically mounted beyond the circumference of the propeller, and having its longitudinal axis designated by lines C—C at an approximately right angle to the longitudinal axis of fuselage 6, designated by line F—F. The chord D establishes an acute angle B with a vertical plane extended through axis F—F of fuselage 6. This angle B indicates the manner in which airfoil 22 is positioned at an angle to the central, normally vertical, longitudinal plane of the fuselage so that the center of lift designated by the arrow X of the compensator, is opposed to the drag of propeller blades 16, and such center of lift lies approximately in the plane designated by line P—P. Obviously, the plane of panel 22 is disposed in a plane which intersects extended plane P—P and panel 22 has a movable section 24 preferably at its upper and rearmost portion which is mounted similarly to the movable edge of well known standard aeroplane rudders and may be operated by the pilot in an identical manner.

A pair of laterally extending stabilizers 26 is positioned at the base of panel 22 and elevators 28 are mounted at the trailing edge of each stabilizer 26 that are likewise operated by the pilot from the control seat 30. As the wing system is rotated in the direction indicated by the arrows R, forward movement in the direction of arrows S is established. It is to be observed that the operation of a helicopter made as just described differs to the extent that the present craft is not designed to hover, rise vertically or to fly stably at slow speeds. It is apparent, therefore, that the aircraft will not take off until its translation is such as to make its controls and the torque compensator effective. The use of landing gear such as described, which causes propeller blades to assume the angle with respect to the horizontal as shown in Fig. 2, has the effect of transmitting the engine torque to the landing gear.

After the aircraft embodying the concepts of this invention rises, compensator panel 22 and the associated parts will become operative by virtue of attack angle B which produces lift X in opposition to the propeller's drag. In properly designed machines, torque effects on fuselage 6 will be completely compensated. Since, as hereinbefore mentioned, center of lift X lies substantially in the centrifugal plane of rotation of propeller blades 16, all torque effects will be operative in this plane and consequently unbalancing of torque will produce a tendency to rotate on the part of fuselage 6, but will not produce an overturning couple.

Briefly, the lift of compensator 22 is balanced across the centrifugal plane of rotation of the wing system. Movable section 24 is provided for the purpose of changing or altering this balance, with the result that the center of lift X will move either above or below the plane designated by line P—P, with a resultant tilting couple which is transmitted to fuselage 6 and in turn to the axis of the propeller disposed on line A—A.

Some of the advantages resulting from the aforementioned control at once present themselves as being the obvious result. Directional control is the most apparent, but this invention is valuable and the discovery is of importance from an aerodynamic standpoint that the use of an extremely small angle B of panel 22 relative to fuselage 6 will perform such a valuable function. Usually with such a small value of B, the propeller torque would be greater than the force at X at slow speeds, hence the fuselage 6 would tend to rotate about axis A—A, causing the aircraft to follow a circular path. By moving section 24 so that X assumes a position below the plane P—P, a tilting couple in the opposite direction is produced which may be made to counteract this circling tendency.

In a like manner, after the helicopter has reached a speed of translation where a laterally tilting of the wing system results as is well known in the art, movement of section 24 in the opposite direction with a resulting rise of the compensator's center of lift X above the plane P—P will counteract this effect. It will be observed that skilled handling of this phase of the control system will permit nearly vertical takeoff.

Despite the fact that on the ground the center of lift of the propeller lies behind the machine's center of gravity, the stabilizers must be given a positive attack angle to the machine's line of normal flight. This is due to the fact that translation of an articulative wing system produces an upward tilting tendency. Inherent stability resides in the dihedral and sweepback of the stabilizers as is well known in the art, while the function of the elevators in varying the propulsive component of the propeller and in pancaking the machine in landing is equally well known.

It will readily be seen that the principles revealed are capable of wide interpretation dependent upon the type of aircraft to which they are applied. For instance, movement of a single elevator would produce the same effect in general as of the section 24. More than one compensator might be used, particularly in the case of a machine designed for hovering where the torque compensating means would revolve independently of the fuselage.

Having thus described the invention, what is claimed as new and desired to be secured by Letters Patent is:

1. In aircraft having rotating wing systems, a torque compensator comprising an airfoil disposed in a plane intersecting the plane of rotation of the propeller and extending substantially equal distances on each side of said plane of rotation.

2. In aircraft having rotating wing systems, a control means consisting of an airfoil intersecting the plane of rotation of the wing system and a movable panel on said air foil above the plane of rotation of the wing system.

3. In aircraft having rotating wing systems, a control means consisting of an airfoil which is intersected substantially at its midpoint by the wing system's plane of rotation.

4. In a helicopter of the character described having a propeller rotatably mounted above the fuselage, a torque compensator comprising an airfoil mounted on the fuselage with the midpoint of its major plane intersecting the extended centrifugal plane of rotation of said propeller.

5. In a helicopter of the character described having a propeller rotatably mounted above the fuselage, a torque compensator comprising an airfoil mounted on the fuselage in a trailing position and intersecting at its midpoint the extended centrifugal plane of rotation of said propeller, said airfoil having a movable section at the rearmost portion thereof.

6. In a helicopter of the character described having a propeller rotatably mounted above the fuselage with its centrifugal plane of rotation meeting the longitudinal axis of the fuselage at a point in front thereof, a torque compensator panel mounted adjacent the propeller with the midpoint of its major plane disposed in and intersecting the centrifugal plane of rotation of the propeller, and laterally extending, opposed stabilizers at the base of said compensator panel, said compensator panel and stabilizers each having movable panels at the trailing edges thereof.

7. In a helicopter of the character described having a propeller rotatably mounted above the fuselage with its centrifugal plane of rotation meeting the longitudinal axis of the fuselage at a point in front thereof, a torque compensator panel mounted adjacent the propeller with the major plane thereof intersecting the centrifugal plane of rotation of the propeller, and laterally extending, opposed stabilizers at the base of said compensator panel, said compensator panel being disposed at a fixed angle to the longitudinal axis of the fuselage whereby to establish an attack angle to the normal direction of flight, said major plane of the said compensator being intersected at substantially its midpoint by the plane of rotation of the propeller.

8. In a helicopter of the character described having a propeller rotatably mounted above the fuselage with its centrifugal plane of rotation meeting the longitudinal axis of the fuselage at a point in front thereof, a torque compensator panel mounted adjacent the propeller with the midpoint of its major plane thereof intersecting the centrifugal plane of rotation of the propeller, and laterally extending, opposed stabilizers at the base of said compensator panel, said compensator panel being disposed at a fixed angle to the longitudinal axis of the fuselage whereby to establish an attack angle to the normal direction of flight, said compensator panel and stabilizers each having movable panels at the trailing edges thereof.

9. In aircraft having rotating wing systems, a torque compensator comprising an airfoil intersected substantially at its midpoint by the plane of rotation of the wing system.

10. In propeller-driven aircraft, a torque compensator comprising an airfoil, the longitudinal axis of which lies in a plane through the propeller's axis of rotation and the center of pressure of which lies substantially in the propeller's plane of rotation.

RUSSELL R. HAYS.